UNITED STATES PATENT OFFICE.

HENRY A. HUGHES, OF PHILADELPHIA, PENNSYLVANIA.

PROCESS OF PRESERVING FRUIT, &c.

SPECIFICATION forming part of Letters Patent No. 534,368, dated February 19, 1895.

Application filed August 11, 1892. Serial No. 442,810. (No specimens.)

*To all whom it may concern:*

Be it known that I, HENRY A. HUGHES, of Philadelphia, in the State of Pennsylvania, have invented a certain new and useful Process of Preserving Fruits, &c., whereof the following is a specification.

My invention is based upon the discovery of certain properties of vegetable cells which have been subjected to treatment in the manner hereinafter set forth.

Ordinarily when fruit whose cells are in their normal state, is placd in a liquid (such as for instance a solution of sugar) stronger or denser than the juice with which the fruit cells are filled, the process of endosmose results in the following changed condition: In accordance with well known laws, the lighter liquid or juice in the cells of fruit is displaced by the heavier liquid, this phenomenon being accompanied by shriveling or shrinking of the fruit itself. I have discovered that while this shrinkage occurs almost universally in the case of fruit, which, though picked, is in a normal state and has not yet undergone decay or decomposition to any substantial extent, it does not occur to any material degree in the case of fruit which, before being placed in the solution, has been heated to or near the temperature of boiling water. Under these circumstances the cells appear to have the same power of setting up the transfer of liquid so as to become filled with the denser surrounding liquid and give out their own juice, but the fruit does not shrink or shrivel as a consequence of such transfer, and even when dried thereafter retains its shape in a marked degree.

I believe that the peculiar behavior of the fruit under the conditions of my process, is due to the fact that the cells (which, normally would still retain some vitality until decay set in) are killed by the heat, and thus deprived of certain properties or qualities characteristic of living tissue, among which is the tendency to shrivel, above mentioned. For convenience of description I use the term "devitalization" to indicate the character of the change, in the fruit cells, produced by such an agency as that of abnormal heat, and the cognate terms "devitalize" and "devitalizing" in an analogous sense. I avail myself of this discovery to replace the juices of the fruit by an antiseptic solution which will not impair the flavor, using preferably a solution of sugar for this purpose, and I also permit the solution to dry or harden around the exterior of the fruit so as to prevent access of air which might otherwise occasion changes.

So far as I am aware my process is adapted to the treatment of all ordinary fruits which contain within their cells an appreciable quantity of juice or light liquid, but for the purposes of this specification it is only necessary to describe the treatment proper for one or two typical instances.

I prefer to use heat as the devitalizing agent for obvious reasons relating to the convenience and economy of treatment, and I have found that heat can be thus employed through the medium of boiling water or steam provided the treatment be carefully conducted.

In the case of berries, such as raspberries, for instance, I proceed as follows: The berries are dropped individually, and with care to prevent their disintegration, into water at a boiling temperature being, however, protected as far as possible against violent agitation while immersed. If not very ripe they may be allowed to remain in the water for a period as long as three minutes, but in ordinary cases I prefer a somewhat less time, generally not over two minutes. They are then removed, rapidly drained and while still hot and covered with the steam are immersed in a cold saturated solution of sugar in water. Endosmosic action at once commences; the juice of the berry exuding and the dense sugar solution penetrating into the interior, but the fruit does not shrivel in consequence of such transfer. As soon as the transfer of a sufficient amount of dense solution into the interior of the fruit has taken place, (which may occupy from twelve to thirty-six hours,) the berries are removed and will now be found quite firm and possessing substantially their natural appearance. They are then dried in any convenient manner so as to permit the sugar to form in a crystalline coating upon the exterior, whereupon they are ready for use.

In the case of peaches, I have found that they may be usually exposed to boiling water for from three to ten minutes according to their ripeness, the ripest peaches needing the shortest exposure. They are then removed as in the case of the berries and while still hot immersed in a similar solution of sugar and permitted to remain until the transfer of solutions has taken place, when they are removed and dried.

If, instead of hot water, steam be used as the devitalizing agent, I find it convenient to apply the same under slight pressure, say at a temperature of 220° Fahrenheit, or thereabout, and under these circumstances the time of exposure will be slightly less than that indicated for boiling water.

I am of course aware that the cooking of fruit is an ordinary operation of the kitchen, and I do not claim the same, and that in the case of canning or preserving, fruit is boiled or heated in a sugar solution in which it is subsequently kept in immersion.

I am aware also that in the ordinary process of producing the so called glaze or crystallized fruit, the fruit is cooked in a sugar solution, then partially dried and repeatedly sprinkled with sugar until enough has been absorbed to cure the fruit and crystallize upon the exterior, and I do not claim such treatment.

Obviously, the preservation of fruit by a sirup of sugar which is permanently maintained around it does not resemble my process, since the fruit is not in such cases dried; nor does the process of preparing the so called crystallized fruit fulfill the conditions of my invention, since in ordinarily crystallizing processes the fruit becomes shriveled and shrunken, and in most cases even though the outside be covered with crystallizable sugar the inside is filled with thin juice, water or inverted sugar solution. After a certain time, such glacé fruit is liable to spoil owing to the setting up of fermentation in the thin internal juices.

In my process, the internal cells of the fruit will be found on microscopic examination to be filled with the dense liquid which crystallizes therein after drying so that fermentation cannot take place and the fruit retains its natural flavor to a very marked extent.

Although I prefer to completely devitalize all the fruit cells, I find that the process can be successfully carried out if the devitalization extends to a considerable depth from the surface, even though the innermost cells should only be partly devitalized. The object of devitalization is to prevent the shrinking and shriveling which ordinarily follows upon infusion or transfer of a solution into the interior of the cells denser than the juice which naturally occupies them and the fruit may be found to have sufficient body in some instances to withstand such shrinkage without the total devitalization of its interior cells.

Having thus described my invention, I claim—

1. The herein before described process of preserving fruit and the like which consists in first subjecting the same to the action of fluid such as water or steam at a temperature approximating the boiling point of water, whereby the superficial cells of the fruit are killed without disintegration of the mass, and then immersing the fruit so treated in a cold preservative solution such as sugar and water until the transfer of fruit juice and of said solution respectively have occurred; substantially as described.

2. The herein before described process of preserving fruit and the like which consists in first subjecting the same to the action of fluid, such as water or steam, at a temperature approximately the boiling point of water, whereby the superficial cells of the fruit are killed without disintegration of the mass, then immersing the fruit so treated in a cold preservative solution, such as sugar and water, until the transfer of the fruit juices and of said solution respectively have occurred, and finally drying the fruit; substantially as described.

HENRY A. HUGHES.

Witnesses:
JAMES H. BELL,
E. REESE.